United States Patent [19]

Usuki et al.

[11] Patent Number: 5,354,817
[45] Date of Patent: Oct. 11, 1994

[54] POLYMER SCALE PREVENTIVE AGENT, POLYMERIZATION VESSEL EFFECTIVE IN PREVENTING POLYMER SCALE DEPOSITION AND PROCESS FOR PREPARATION OF POLYMER

[75] Inventors: Masahiro Usuki, Ibaraki; Hajime Kitamura, Chiba; Susumu Ueno; Mikio Watanabe, both of Ibaraki, all of Japan; Richard W. Armentrout, La Jolla; Thomas J. Pollock, San Diego, both of Calif.

[73] Assignee: Shin-Etsu Chemical Co., Ltd., Tokyo, Japan

[21] Appl. No.: 870,953

[22] Filed: Apr. 20, 1992

[30] Foreign Application Priority Data

Apr. 19, 1991 [JP] Japan ................ 3-115275

[51] Int. Cl.$^5$ .............................. C08F 2/00
[52] U.S. Cl. ................................... 526/62
[58] Field of Search .......................... 526/62

[56] References Cited

U.S. PATENT DOCUMENTS

| 4,517,344 | 5/1985 | Mitani et al. | 526/62 |
| 5,241,022 | 8/1993 | Watanabe et al. | 526/62 |

FOREIGN PATENT DOCUMENTS

| 0372967 | 6/1990 | European Pat. Off. | 526/62 |
| 0467267 | 1/1992 | European Pat. Off. | 526/62 |
| 0467276 | 1/1992 | European Pat. Off. | |
| 0021484 | 2/1979 | Japan | 526/62 |

OTHER PUBLICATIONS

Chem. Abstracts, vol. 96, No. 1, Jan. 1982 & JP A 81 112901 Sep. 5, 1981 Shin-Etsu Chemical Co.

*Primary Examiner*—Peter Szekely
*Attorney, Agent, or Firm*—McAulay Fisher Nissen Goldberg & Kiel

[57] ABSTRACT

A polymer scale preventive agent for use in polymerization of a haloethylene or a monomer mixture containing the same, comprising:

(A) an aromatic compound having at least one group selected from the class consisting of primary, secondary and tertiary amino groups, quaternary ammonium groups and the azo group and/or a dye having at least one group selected from said class, and (B) an alkali metal or ammonium salt of a polyvinylsulfonic acid, and (C) a naphthoquinone natural dye; a polymerization vessel having a coating comprising said scale preventive agnet. A process of preparing a haloethylene polymer using the vessel can produce a polymer of high quality without polymer scale deposition.

3 Claims, No Drawings

POLYMER SCALE PREVENTIVE AGENT, POLYMERIZATION VESSEL EFFECTIVE IN PREVENTING POLYMER SCALE DEPOSITION AND PROCESS FOR PREPARATION OF POLYMER

BACKGROUND OF THE INVENTION

1. Field of the Invention

The present invention relates to a polymer scale preventive agent and a polymerization vessel for use in polymerization of a monomer comprising a haloethylene, and a process for preparation of a haloethylene polymer using the vessel.

2. Description of Prior Art

In processes of preparation of polymers by polymerizing a monomer in a polymerization vessel, the problem that polymers deposit on the inner wall surface and other parts which come into contact with the monomer such as stirring blades of the polymerization vessel in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomers, there is a danger that the operators may be exposed to the unreacted monomers, which may cause some physical disorders.

Heretofore, there are known methods for preventing polymer scale deposition in which the inner wall and so forth are coated with a suitable substance as a polymer scale preventive agent.

Such substances suited as polymer preventive agents include, for example, particular polar compounds (Japanese Patent Publication (KOKOKU) No.45-30343(1970)); dyes or pigments (Japanese Patent Publication (KOKOKU) Nos. 45-30835(1970)) and 52-24953(1977)); aromatic amine compound (Japanese Pre-examination Patent Publication (KOKAI) No. 51-50887(1976)); a reaction product of a phenolic compound with an aromatic aldehyde (Japanese Pre-examination Publication (KOKAI) No. 55-54317(1980)).

However, it is not necessarily to attain satisfactory prevention of scale deposition in the polymerization or copolymerization of a monomer having an ethylchic double bond comprising a haloethylene such as a vinyl halide, a vinylidene halide or the like as an essential component.

Where polymerization is repeated in the same polymerization vessel internally coated with a conventional polymer scale preventive agent, the scale preventing effect will gradually be lowered. Specifically, if scale deposition cannot be recognized by naked eyes after a polymerization run, a thin layer of scale may have been formed actually. Once such a thin layer has been formed, even if a coating of a scale preventive agent is formed before each batch of polymerization, the coating may peel and mix into the polymerization liquid. This reduces the number of polymerization runs in which deposition of polymer scale is effectively prevented, resulting in that far from improving productivity, it impairs the quality of polymeric products.

Further, in the polymerization of a haloethylene or the copolymerization of a monomer mixture containing largely a haloethylene, the effect of preventing polymer scale deposition varies depending on the kinds of additives, e.g., a polymerization initiator, a chain transfer agent, a suspension agent, etc., the type of polymerization, and materials constituting the inner wall of polymerization vessels. Therefore, the development of a more excellent polymer scale preventive agent whose performance is not affected by any polymerization conditions is desired.

SUMMARY OF THE INVENTION

Accordingly, it is an object of the present invention to provide a polymer scale preventive agent and a polymerization vessel effective in preventing polymer scale deposition on the inner wall of a polymerization vessel in the polymerization of a monomer having an ethylenic double bond comprising a haloethylene, and to provide a process for preparation of a haloethylene polymer of high quality without polymer scale deposition.

According to the present invention, as a means of achieving the object above, there is provided a polymer scale preventive agent for use in polymerization of a monomer having an ethylenic double bond comprising a haloethylene, represented by the general formula (I):

$$(X)(R)C=CH_2 \qquad (I)$$

wherein X is a halogen atom and R is a hydrogen atom or halogen atom; said agent comprising:

(A) an aromatic compound having at least one group selected from the class consisting of primary, secondary and tertiary amino groups, quaternary ammonium groups and the azo group and/or a dye having at least one group selected from said class, and (B) at least one compound selected from the group consisting of alkali metal salts and ammonium salts of polyvinylsulfonic acids, and (C) a naphthoquinone natural dye Further, the present invention provides a polymerization vessel having on its inner wall surfaces a coating comprising said components (A), (B) and (C).

Still further, the present invention provides a process of preparing a haloethylene polymer by polymerization of a monomer having an ethylenic double bond comprising a haloethylene having the general formula (I), comprising the step of carrying out said polymerization in said polymerization vessel having said coating, whereby polymer scale deposition is prevented.

According to the present invention, polymer scale deposition on the inner wall surfaces, etc. of a polymerization vessel can be effectively prevented in the polymerization of a haloethylene or a monomer mixture comprising a haloethylene, without being affected by the composition of a polymerization mixture or the kind of additives such as a polymerization initiator, etc. Particularly, polymerization can be repeated without scale deposition. These effects can be attained in any type of polymerization such as suspension polymerization, emulsion polymerization, bulk polymerization, solution polymerization, and gas phase polymerization. The effects can also be attained in polymerization in a polymerization vessel made of a steel including stainless steels or a vessel whose inner walls are lined with glass.

DETAILED DESCRIPTION OF PREFERRED EMBODIMENTS

(A) Aromatic Compound and/or Dye

The aromatic compound and/or the dye used as the component (A) of the polymer scale preventive agent in the present invention have/has at least one group selected from the class consisting of primary, secondary and tertiary amino groups, quaternary ammonium groups and the azo group.

The aromatic compound having said group includes, for example, aromatic amines such as diaminodiphenylamine, ethylenedianiline, and diaminonaphthalene, acridines such as acridine, and diaminoacridine, phenadines such as phenadine and aminophenazines, azobenzenes such as aminoazobenzenes and hydroxyazobenzenes, hydrochlorides and sulfates thereof, and alkaloids such as berberine hydrochloride.

The dye having said group includes, for example, C.I. Solvent Yellow 2, 4, 5, 6, 14, 15, 16, 19, 21, 33, 56, 61 and 80; C.I. Solvent Orange 1, 2, 14, 37, 40, 44 and 45; C.I. Solvent Red 1, 3, 8, 23, 24, 25, 27, 30, 49, 81, 82, 83, 84, 100 and 121; C.I, Solvent Brown 3, 5, 20 and 37; C.I.Solvent Black 3, 5, 7, 22 and 23; C.I. Acid Black 123; C.I. Disperse Yellow 1, 3, 4, 5, 7, 31, 33, 49, 50, 60, 61, 64, 66, 71, 72, 76, 78 and 79; C.I. Disperse Orange 1, 3, 5, 11, 13, 20, 21, 30, 32, 41, 43, 45, 46, 49, 50 and 51; C.I.Disperse Red 1, 4, 5, 7, 11, 12, 13, 15, 17, 43, 52, 53, 54, 55, 56, 58, 59, 60, 65, 72, 73, 74, 75, 76, 80, 82, 84, 88, 90, 91, 92, 97, 99, 101, 103, 113, 116, 117, 122, 125, 126, 127, 128 and 129; C.I. Disperse Violet 1, 4, 8, 10, 18, 23, 24, 26, 28, 30, 33, 37 and 38; C.I. Disperse Blue 1, 5, 6, 43, 44, 88 and 96; C.I.Disperse Brown 3 and 5; C.I. Disperse Black 1, 2, 10, 26, 27, 28, 29, 30 and 31; C.I. Basic Red 2 and 12; C.I. Basic Blue 1, 6, 7, 9, 12, 16, 24 and 25; C.I. Basic Black C.I. Basic Orange 2, 14 and 15; C.I. Basic Violet 10 and 14; C.I. Basic Yellow 1, 4 and 6; C.I. Basic Green 5 and 12; C.I. Basic Brown 1; and condensation products of an aromatic amine compound with an aromatic nitro compound, e.g., condensation products obtained by condensation of an aromatic amine compound and an aromatic nitro compound in the presence of a specified condensation catalyst at a temperature of from 100° C. to 250° C., disclosed in U.S. Pat. No. 4,528,336 which is incorporated herein by reference, specifically condensation products obtained by condensation of an aromatic amine compound having the general formula (II):

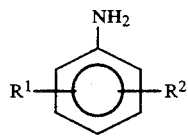

(II)

wherein $R^1$ is a hydrogen atom, chlorine atom, amino group —NH$_2$, phenylazo group —N=N—C$_6$H$_5$, hydroxy group, acetyl group, methoxy group, phenylamino group —NH—C$_6$H$_5$, aminophenylamino group —NH—C$_6$H$_4$—NH$_2$, methoxyphenylamino group —NH—C$_6$H$_4$—OCH$_3$, dimethylamino group, hydroxyphenylamino group —NH—C$_6$H$_4$—OH, acetylamino group or an alkyl group having from 1 to 3 carbon atoms, and $R^2$ is a hydrogen atom, amino group, hydroxy group or methyl group, with an aromatic nitro compound having the general formula (III):

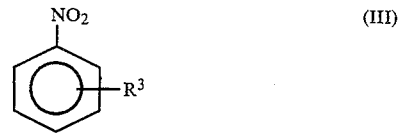

wherein $R^3$ is a hydrogen atom, chlorine atom, hydroxy group, methoxy group, ethoxy group, acetyl group, amino group, carboxyl group —COOH or sulfo group —SO$_2$OH, in the presence of a condensation catalyst at a temperature of 100° C. to 250° C. disclosed in said U.S. Patent. (Refer to Remark (1) below).

The aromatic compounds and dyes can be used singly or in combination of two or more.

Among them, out of the aromatic compounds, preferred are diaminoacridines, diaminonaphthalenes, and berberine hydrochloride, and out of the dyes, preferred are C.I. Solvent Black 3, 5, 7 and 22, C.I. Basic Black 2, C.I. Disperse Blue 5, and the condensation products obtained by the condensation of an aromatic amine compound having the general formula (II) wherein $R^1$ is a hydrogen atom, amino group, chlorine atom, phenylamino group or hydroxyphenylamino group and $R^2$ is a hydrogen atom, amino group, hydroxy group or methyl group, with an aromatic nitro compound having the general formula (III) wherein $R^3$ is a hydrogen atom, hydroxy group, methoxy group or chlorine atom (Specifically, Condensation Products I, IV, XI, XII, XIV and XVII). Particularly preferred are C.I. Solvent Black 3 and 5, C.I. Disperse Blue 5, and Condensation Products No. I and XVII disclosed in the U.S. Pat. No. 4,528,336, and described in Table 3 later. (Refer to Remark (2) below).

(B) Salt of Polyvinylsulfonic Acid

The salt of a polyvinylsulfonic acid used as the component (B) of the polymer scale preventive agent in this invention preferably has a polymerization degree of 500 or more, more preferably from 1,000 to 5,000 because the polymer scale preventing effects are enhanced.

The alkali metal salt or ammonium salt of a polyvinylsulfonic acid is represented by the following structural formula:

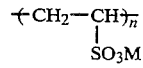

wherein M is an alkali metal such as K or Na, or an ammonium ion and n is the polymerization degree, and the sulfonation degree is preferably from 90% to 95%. Specifically, the sulfonates include, for example, a sodium polyvinylsulfonate or a potassium polyvinylsulfonate.

The preparation of the alkali metal salt or ammonium salt of a polyvinylsulfonic acid can be performed, for example, in the case of sodium polyvinylsulfonate, by polymerizing sodium vinylsulfonate in accordance with conventional procedures.

(C) Naphthoquinone Natural Dye

The naphthoquinone natural dye, the component (C) of the scale preventive agent, includes, for example, naphthoquinones such as lawsone, juglone, plumbagin, and lapachol; naphthazarins such as naphthazarin, 2,3-dihydroxynaphthazarin, 2-methylnaphthazarin, naphthopurpurin, 2-hydroxy-3-methylnaphthazarin, 2-hydroxy-3-ethylnaphthazarin, 2-hydroxy-3-acetylnaphthazarin, 2,7,-dimethylnaphthazarin, alkannan, echinochrome A, and spinochrome A; shikonins such as alkannin, shikonin, acetylshikonins, isobutylshikonins, $\beta,\beta'$-dimethylacrylshikonins, $\beta$-hydroxyisovalerylshikonins, and teracrylshikonins; and derivatives thereof. These can be used singly or in combination of two or more.

Among these naphthoquinone natural dyes, preferred are lawsone, naphthopurprin, alkannan, alkannin, shikonins and derivatives of shikonins such as acetylshikonins, isobutylshikonins, $\beta,\beta'$-dimethylacrylshikonins, and teracrylshikonins, and particularly preferred are lawsone, alkannin, shikonins, and derivatives of shikonins. As the shikonins and derivatives thereof, extracts obtained from naturally occurring lithospermum root into an organic solvent can be used, and those mass produced by a biotechnique are recently being available commercially.

From the viewpoint of the scale preventing effects, for particularly preferred combinations of the components (A), (B) and (C), the component (A) is at least one member selected from the group consisting of diaminoacridine, berberine hydrochloride, diaminonaphthalene, C.I. Solvent Black 3 and 5, and condensation products of Nos. I and XVII disclosed in the U.S. Pat. No. 4,528,336; the component (B), a sodium polyvinylsulfonate with a polymerization degree of from 1,500 to 3,000; and the component (C), at least one member selected from the group consisting of lawsone, alkannin, shikonins, acetylshikonins, and the extracts from lithospermum root.

The polymer scale preventive agent of the present invention is used for preventing deposition of polymer scale by forming a coating on the inner wall surfaces, etc. of a polymerization vessel.

The polymer scale preventive agent may contain, in addition to said components (A), (B) and (C) which are effective in preventing scale deposition, a solvent, a surface active agent, a water-soluble polymeric compound, an organic or inorganic pH adjuster, etc. For forming said coating on the inner wall surfaces, etc. of a polymerization vessel, normally the polymer scale preventive agent is used in the form of a liquid (solution or dispersion), i.e., as a coating liquid.

In the polymer scale preventive agent of the present invention, normally, the component (B) is contained preferably in an amount of 1 to 100,000 parts by weight, more preferably 10 to 10,000 parts by weight per 100 parts of the component (A). The component (C) is normally contained in an amount of 0.1 to 5,000 parts by weight, preferably 1 to 500 parts by weight per 100 parts of the component (A). The respective weight ratios of the components (B) and (C) to the component (A) are within the ranges, make it possible to prevent polymer scale deposition more effectively by virtue of the combined use thereof. If the ratio of the component (B)/the component (A) is outside the range specified above, when the preventive agent of this invention is used as a coating liquid, sediment of the component (A) may be formed and the coating liquid may be unstable, so that uniform coating can be formed with difficulty.

Preparation of Coating Liquid

The coating liquid mentioned above is prepared by adding the components (A), (B) and (C) to a suitable solvent.

The solvents used for preparation of the coating liquid include, for example, water; alcohols such as methanol, ethanol, propanol, 1-butanol, 2-butanol, 2-methyl-1-propanol, 2-methyl-2-propanol, 3-methyl-l-butanol, 2-methyl-2-butanol, and 2-pentanol; ketones such as acetone, methyl ethyl ketone, and methyl isobutyl ketone; ethers such as 4-methyl dioxolan, and ethylene glycol diethyl ether; esters such as methyl formate, ethyl formate, methyl acetate, and methyl acetoacetate; furans such as tetrahydrofuran, furfural, furfuryl alcohol and tetrahydrofurfuryl alcohol; aliphatic hydrocarbons such as n-hexane and n-heptane; aromatic hydrocarbons such as benzene, toluene, and xylene; halogenated hydrocarbons such as chloromethylene, 1-chlorobutane, amyl chloride, dichloroethylene, and 1,1,2-trichloroethane; and aprotic organic solvents such as acetonitrile, formamide, dimethylformamide, dimethyl sulfoxide and N-methylpyrrolidone. These solvents are used singly or as a mixed solvent of two or more.

Among these solvents, particularly preferred are water and alcohols such as methanol and ethanol, and mixed solvents thereof.

The total concentration of the components (A), (B) and (C) is not limited as long as the coating weight after dried described later is attained, but is normally from 0.00 1 to 5% by weight, preferably from 0.001 to 2% by weight. Further the concentration of the component (C) is normally from 0.0001 to 1% by weight, preferably from 0.001 to 0.5% by weight. If the concentration of the component (C) is too large, sediment of the component (C) may be formed, so that uniform coating on the inner wall of a polymerization vessel can be formed with difficulty.

To the coating liquid, (D) a water-soluble polymeric compound or (E) a pH adjuster may be optionally added as necessary. The coating liquid preferably contains the water-soluble polymeric compound (D), and further contains the pH adjuster (E) in such an amount that pH of the liquid may be adjusted to 7 or below, preferably 6 or below.

(D) Water-soluble polymeric compound

The water-soluble polymeric compound (D) includes, for example, hydroxyl group-containing polymeric compounds, amphoteric polymeric compounds, anionic polymeric compounds, and cationic polymeric compounds. Particularly preferred are hydroxyl group-containing polymeric compounds and cationic polymeric compounds.

The hydroxyl group-containing polymeric compound includes, for example, starch and derivatives thereof such as amylose, amylopectin, dextrin, oxidized starch, acetyl starch, nitrostarch, methyl starch, and carboxymethyl starch; hydroxyl group-containing plant mucous polysaccharide such as pectic acid, protopectin, pectinic acid, alginic acid, laminatin, fucoidin, agar, and carrageenan; hydroxyl group-containing animal mucous polysaccharide such as hyaluronic acid, chondroitin sulfonic acid, heparin, keratosulfonic acid, chitin, charonin, and limacoitin sulfonic acid; nucleic acids such as ribonucleic acid and deoxyribonucleic acid; cellulose derivatives such as methyl cellulose, ethyl cellulose, carboxymethyl cellulose, glycol cellulose, benzyl cellulose, cyanoethyl cellulose, cellulose methylene ether, triphenylmethyl cellulose, formyl cellulose, cellulose acetate, cellulose propionate, cellulose butyrate, cellulose acetate propionate, cellulose sulfonate ester, cellulose carbamate ester, nitrocellulose, cellulose phosphate, and cellulose xanthogenate; hemicelluloses such as xylan, mannan, arabogalactan, and araban; lignins such as alcohol lignin, dioxane lignin, phenol lignin, hydrotropic lignin, mercaptolignin, thioglycollic acid lignin, lignin sulfonic acid, alkali lignin, thioalkali lignin, acid lignin, curproxam lignin, and periodate lignin; phenol-formaldehyde resins, partially saponified polyvinyl alcohols, and completely saponified polyvinyl alcohols.

The amphoteric polymeric compounds include, for example, glue, gelatin, casein, and albumin.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, and alkali metal salts or ammonium salts of these, and carboxymethyl cellulose.

The cationic polymeric compound includes cationic polymeric electrolytes containing a nitrogen atom, including, for example, polyvinylamines, polyethyleneamines, polyethyleneimines, polyacrylamides, N-vinyl-2-pyrrolidone/acrylamide copolymer, polyvinylpyridines, polyvinylpyrrolidones, polyvinylcarbazoles, polyvinylimidazolines, polydimethylaminoethyl acrylates and polydimethylaminoethyl methacrylates. These water-soluble polymeric compounds may be used singly or in combination of two or more.

Among these water-soluble polymeric compounds (D) preferred are polyvinyl alcohols, polyethyleneimines, polyvinylpyrrolidones, carboxymethyl cellulose, and particularly preferred are polyvinyl alcohols and polyvinylpyrrolidones. Where a polyvinyl alcohol is used as the component (D), the preventing effect against scale deposition depends on the saponification degree and the polymerization degree of the polyvinyl alcohol. Polyvinyl alcohols with a saponification degree of from 80 to 100 and a polymerization degree of 2,000 or more can bring about a particularly good scale deposition preventing effect.

The concentration of the component (D) in a coating liquid is preferably in the range of from 0.0001 to 5% by weight, more preferably from 0.001 to 0.5% by weight.

(E) pH adjuster

The pH adjuster (E) includes, for example, sulfuric acid, hydrochloric acid, phosphoric acid, nitric acid, carbonic acid, perchloric acid, molybdic acid, tungstic acid, phosphomolybdic acid, phosphotungstic acid, molybdosilicic acid, tungstosilicic acid, formic acid, acetic acid, oxalic acid, lactic acid, maleic acid, glycollic acid, thioglycollic acid, p-toluenesulfonic acid, tannic acid, phytic acid and the acidic salts thereof. These may be used singly or in combination of two or more. Among these, particularly preferred are phytic acid, phosphoric acid, phosphomolybdic acid, tungstosilicic acid, p-toluenesulfonic acid, molybdic acid and tungstic acid. These pH adjusters are preferably used as an aqueous solution with a suitable concentration when the pH of a coating liquid is adjusted.

Preferred combinations of the components (A) to (E) from viewpoint of scale preventing effects are comprised of the preferred combinations of (A), (B) or (C) mentioned above plus a polyvinyl alcohol with a saponification degree of 80 to 100 % and a polymerization degree of 2,000 or more for the component (D) and phytic acid for the component (E).

Formation of the coating

The polymer scale preventive liquid as prepared above is applied to the inner walls of a polymerization vessel and then dried sufficiently, followed by washing with water if necessary, to form the coating. The drying may be carried out at a temperature from room temperature to 100° C., for instance.

The polymer scale preventive liquid is preferably applied to not only the inner wall surfaces of a polymerization vessel but also other parts with which the monomer comes into contact during polymerization to form a coating on such parts. For example, it is preferred to apply the coating liquid to a stirring shaft, stirring blades, condensers, headers, search coil, bolts, nuts, etc. to form the coating thereon.

More preferably, for formation of the coating, the polymer scale preventive liquid is applied to portions with which monomers do not come into contact during polymerization but on which polymer scale may deposit, for example, portions of recovery system for unreacted monomer with which unreacted monomer comes into contact, such as inner surfaces, etc. of equipment and pipes of the recovery system. Specifically, such portions include the inner surfaces of monomer distillation columns, condensers, monomer stock tanks and valves.

The method of applying the coating liquid is not particularly limited, and includes, for example, the brush coating, spray coating, the method of filing the polymerization vessel with the coating liquid followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the liquid is applied, hot air with an suitable elevated temperature is blown to the coated surface, and a method in which the inner wall surface of a polymerization vessel and the surfaces of other parts to be coated are previously heated to from 30° to 80° C., and the polymer scale preventive liquid is directly applied to the heated inner wall surfaces, etc. After dried, the coated surfaces are washed with water if necessary.

The coating thus obtained normally has a coating weight of preferably 0.001 to 5 g/m$^2$, and more preferably from 0.01 to 2 g/m$^2$.

Polymerization

After the formation of the coating, polymerization is carried out in accordance with conventional procedures. That is, a monomer having an ethylenic double bond, a polymerization initiator (catalyst) and optionally a polymerization medium such as water, etc., a suspension agent, a solid dispersing agent and a dispersing agent such as a nonionic emulsifying agent, an anionic emulsifying agent, etc., are charged into the polymerization vessel, followed by carrying out polymerization according to conventional methods.

The monomer to be polymerized in the process of the present invention may be a haloethylene presented by said general formula (I) alone, or may be a monomer mixture of a haloethylene and one or more other monomers having an ethylenic double bond that are copolymerizable with the haloethylene. The monomer mixture normally contains the haloethylene in an amount of 50% or more by weight. The haloethylene represented by the general formula (I) includes, for example, vinyl halides such as vinyl chloride, vinyl fluoride, etc.; vinylidene halides such as vinylidene chloride, vinylidene fluoride, etc. These monomers can be used singly or as a monomer mixture of two or more. The other monomers having an ethylenic double bond, which can be used as a comonomer, include, for example, vinyl esters such as vinyl acetate and vinyl propionate; acrylic acid, methacrylic acid, and esters or salts thereof; diene monomers such as butadiene, chloroprene and isoprene; styrene and $\alpha$-methylstyrene; and vinyl ethers. These monomers can be used singly or in combination of two or more.

There are no particularly limitations on the type of polymerization to which this invention can be applied. The present invention is effective in any type of polymerization such as suspension polymerization, emulsion polymerization, solution polymerization, bulk polymerization, and gas phase polymerization; particularly, more effective in polymerization in aqueous medium such as suspension polymerization, emulsion polymerization, etc.

Specifically, in the case of suspension polymerization and emulsion polymerization, polymerization is generally performed as follows, for instance. First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm$^2$.G). The polymerization is normally carried out at a temperature of from 30° to 150° C. During the polymerization, one or more of water, a dispersing agent and a polymerization initiator may be added, if necessary. Suitable reaction temperature during the polymerization is different depending on the kind of monomer to be polymerized. For example, in the case of polymerizing vinyl chloride, polymerization may be carried out at 30° to 80° C. The polymerization may be judged to be completed when the pressure inside the polymerization vessel falls to from about 0 to 7 kgf/cm$^2$.G or when cooling water which passes through a jacket provided around the polymerization vessel indicates almost the same temperature at the inlet where it is charged and at the outlet where it is discharged (i.e., when liberation of heat due to polymerization reaction has been completed.) The water, dispersing agent and polymerization initiator are used in amounts of about 20 to 500 parts by weight, about 0.01 to parts by weight, and about 0.01 to 5 parts by weight, respectively, per 100parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from $-10°$ C. to 250° C. Specifically, bulk polymerizations include, for example, liquid bulk polymerization and gas phase polymerization for vinyl chloride.

The present invention enables prevention of polymer scale deposition, independent of materials constituting the inner wall, etc. of a polymerization vessel. For example, deposition of polymer scale can be prevented even in the case polymerization is carried out in a polymerization vessel made of a steel including stainless steel or a vessel whose inner walls are lined with glass.

Any additive materials that have been conventionally added in a polymerization system can be used without any limitation. More specifically, this invention can effectively prevent polymers from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, $\alpha$-cumyl peroxyneodecanoate, cumene hydroperoxide, cyclohexanone peroxide, t-butyl peroxypivalate, bis(2-ethoxyethyl) peroxydicarbonate, benzoyl peroxide, lauroyl peroxide, 2,4-dichlorobenzoyl peroxide, diisopropyl peroxydicarbonate, $\alpha, \alpha'$-azobisisobutyronitrile, $\alpha, \alpha'$-azobis-2,4-dimethylvaleronitrile, potassium peroxodisulfate, ammonium peroxodisufate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

In the case of applying the present invention, particularly suitable polymerization includes, for example, suspension and emulsion polymerizations of vinyl halides such as vinyl chloride, etc., vinylidene halides or monomer mixtures containing largely a vinyl halide or a vinylidene halide.

In the practical use of the polymer scale preventive agent of the present invention, the coating operation of the coating liquid may be conducted every batch or every some tens of batches. Particularly, the coating formed by applying the coating liquid which contains the water-soluble polymeric compound and whose pH has been adjusted to 7 or below, has a high durability and maintains the polymer scale preventing action. Therefore, normally, coating treatment may be conducted every several batches, so that the polymerization vessel can be used repeatedly without deposition of polymer scale on the inner wall, etc. of the vessel.

C. EXAMPLES

The present invention is now described in detail by way of working examples and comparative examples. In each of the Tables 1 and 2 below, Nos. of Experiment marked with * indicate comparative examples, and the other Experiment Nos., working examples of the present invention.

Example 1

Preparation of Coating Liquids

A component (A) (an aromatic compound and/or dye) indicated in Table 1, was dissolved or dispersed in a solvent. To the resulting mixture, an aqueous solution of a component (B), a sodium polyvinylsulfonate with a polymerization degree of 1,500 was added and further a methanol solution of a component (C) indicated in Table 1 was added, so that Coating Liquids of Nos. 1 to 30 were prepared. In the preparation above, the concentration of the component (A) in the coating liquids was adjusted to 0.1% by weight.

In Table 1, in regard to each of the coating liquids of Nos. 1 to 30, the kind of the component (A), the weight ratio of the component (A)/(B), the kind and the concentration of the component (C), and the composition of the solvent used are given. However, the coating liquids of Nos. 4, 5 and 6 are comparative examples in which no component (C) is contained, and the coating liquid of Nos. 1,2 and 3 are comparative examples in which neither component (B) nor component (C) is contained.

Example 2

In each experiment, polymerization was carried out in the following manner using a stainless steel polymerization vessel with an inner capacity of 20 liters and equipped with a stirrer.

In Experiments of Nos. 102 to 140, a coating liquid indicated in Table 2 was applied to the inner wall surfaces, stirring shaft, stirring blades, baffles and other parts with which monomers come into contact during polymerization, and then dried at 50° C. for 15 minutes by heating and washed with water to form a coating. The coating thus formed had a coating weight of 0.1 g/m² after dried.

In Experiment Nos. 106, 107, 131 and 132, the coating liquid indicated in Table 1 was used for application as they were originally prepared. In Experiments Nos. 108 to 130 and 133 to 140, to the coating liquids indicated in Table 1, a component (D) (water-soluble polymeric compound) and/or a component (E) (pH adjuster) indicated in Table 2 was added, and resulting liquids were used for application. However, Experiment No. 101 is a comparative example in which no coating liquid was applied, and Experiment Nos. 102 to 105 are comparative experiments in which the coating liquids prepared outside the scope of the present invention, were applied.

In Table 2, No. of the coating liquid, the kind and concentration of the component (D), the kind of the component (E), a pH adjuster, and the pH of the coating liquid in each experiment are given.

In the polymerization vessel in which a coating was so formed, were charged 5.2 kg of vinyl chloride, 10 kg of water, 5.2 g of a partially saponified polyvinyl alcohol and 2.6 g of bis(2-ethylhexyl) peroxydicarbonate.

TABLE 1

| No. of coating liquid | (A) Aromatic compound or dye | Wt. ratio (A)/(B) | (C) Naphtoquinone natural dye | Conc. Wt. % | Solvent Composition | Wt. ratio |
|---|---|---|---|---|---|---|
| 1* | p-Aminoazobenzene | 100/0 | — | — | Methanol | — |
| 2* | 3,6-Diaminoacridine | 100/0 | — | — | Methanol | — |
| 3* | Condensation product I[1] | 100/0 | — | — | Methanol | — |
| 4* | 1,8-Diaminonaphthalene | 40/100 | — | — | Water/Methanol | 40/60 |
| 5* | Condensation product XIV[1] | 50/100 | — | — | Water/Methanol | 50/50 |
| 6* | Berberine hydrochloride | 50/100 | — | — | Water/Methanol | 60/40 |
| 7 | Phenazine | 50/100 | Alkannan | 0.03 | Water/Methanol | 50/50 |
| 8 | Ethylenedianiline | 50/100 | Juglone | 0.04 | Water/Methanol | 40/60 |
| 9 | 3,6-Diaminoacridine/p-Aminoazobenzene (30/20) | 50/100 | 2,3-Dihydroxynaphthazarin | 0.04 | Water/Methanol | 50/50 |
| 10 | Berberine hydrochloride/1,8-Diaminonaphthalene (20/30) | 50/100 | Shikonin | 0.02 | Water/Methanol | 50/50 |
| 11 | p,p'-Diaminodiphenylamine | 60/100 | Naphthazarin | 0.05 | Water/Methanol | 40/60 |
| 12 | p-Aminoazobenzene | 60/100 | Lawson, Alkannin | 0.05 | Water/Methanol | 50/50 |
| 13 | Berberine hydrochloride | 50/100 | Naphthopurprin | 0.05 | Water/Methanol | 50/50 |
| 14 | 1,5-Diaminonaphthalene/Phenazine (25/25) | 50/100 | Shikonin | 0.0015 | Water/Methanol | 50/50 |
| 15 | C. I. Solvent Black 3 | 40/100 | Extract from lithospermum | 0.03 | Water/Methanol | 70/30 |
| 16 | C. I. Solvent Black 5 | 40/100 | Lawson | 0.03 | Water/Methanol | 70/30 |
| 17 | C. I. Solvent Black 7 | 40/100 | Extract from lithospermum root | 0.03 | Water/Methanol | 70/30 |
| 18 | C. I. Solvent Black 22 | 40/100 | Extract from lithospermum root | 0.03 | Water/Methanol | 70/30 |
| 19 | C. I. Basic Black 2 | 40/100 | Plumbagin | 0.04 | Water/Methanol | 40/60 |
| 20 | C. I. Disperse Blue 5 | 40/100 | Lawson | 0.05 | Water/Methanol | 40/60 |
| 21 | C. I. Disperse Brown 3 | 40/100 | Juglone | 0.05 | Water/Methanol | 40/60 |
| 22 | C. I. Basic Orange 14 | 40/100 | Shikonin | 0.015 | Water/Methanol | 50/50 |
| 23 | C. I. Basic Yellow 1 | 40/100 | Acetylshikon | 0.02 | Water/Methanol | 50/50 |
| 24 | C. I. Basic Brown 1 | 40/100 | Lawson | 0.03 | Water/Methanol | 40/60 |
| 25 | Condensation product I[1] | 40/100 | Shikonin | 0.015 | Water/Methanol | 50/50 |
| 26 | Condensation product IV[1] | 40/100 | Shikonin | 0.015 | Water/Methanol | 50/50 |
| 27 | Condensation product XI[1] | 40/100 | Shikonin | 0.015 | Water/Methanol | 50/50 |
| 28 | Condensation product XII[1] | 40/100 | Extract from lithospermum root | 0.02 | Water/Methanol | 60/40 |
| 29 | Condensation product XIV[1] | 40/100 | Extract from lithospermum root | 0.02 | Water/Methanol | 60/40 |
| 30 | Condensation product XVII[1] | 40/100 | Extract from lithospermum root | 0.02 | Water/Methanol | 60/40 |

Remarks:
[1]The condensation products are disclosed in U.S. Pat. No. 4,528,336 and described in Table 4 later.

Polymerization was then carried out with stirring at 58° C. for 6 hours. After the completion of the polymerization, the resulting polymer and unreacted monomer were recovered, and the inside of the polymerization vessel was washed with water.

Thereafter, 3 batches of polymerization were performed by repeating said procedure under the polymerization condition described above. After completion of the 3 batches, the amount of the polymer scale deposition was measured. The results are given in Table 2.

1,2-, 1,3- and 1,4-phenylenediamines, 2-, 3- and 4-aminophenols, 4-aminodiphenylamine and 4,4'-diaminodiphenylamine.

Examples of the aromatic nitro compound include: nitrobenzene, 2-, 3- and 4-nitrophenols, 2-, 3- and 4-nitroanisoles, 2-, 3- and 4-nitrophenetoles, 2-, 3- and 4-chloronitrobenzenes, 2-, 3- and 4-nitroanilines, 2-, 3and 4-nitrobenzoic acids, 2-, 3- and 4-nitrobenzenesulfonic acids and the like, among which particularly preferred are nitrobenzene, 2-, 3- and 4-nitrophenols, 2-, 3-

TABLE 2

| Exp. No. | No. of coating liquid | (D) Water-soluble polymer Compound | (D) concentration (g/l) | (E) pH adjuster | pH | amount of scale after 3 batches |
|---|---|---|---|---|---|---|
| 101* | — | — | — | — | — | 1500 |
| 102* | 1* | — | — | — | 6.0 | 1400 |
| 103* | 3* | — | — | — | 6.0 | 180 |
| 104* | 5* | — | — | — | 3.0 | 80 |
| 105* | 6* | — | — | — | 6.0 | 95 |
| 106 | 25 | — | — | — | 3.0 | 27 |
| 107 | 29 | — | — | — | 3.0 | 30 |
| 108 | 7 | Polyvinyl alcohol (s:99%, p:3000)* | 0.2 | — | 6.0 | 13 |
| 109 | 8 | Alginic acid | 0.5 | Sulfuric acid | 3.0 | 20 |
| 110 | 9 | Polyacrylic acid | 0.6 | Polyphosphoric acid | 3.0 | 15 |
| 111 | 10 | Polyvinylpyrrolidone | 0.3 | Phytic acid/Phosphoric acid | 3.0 | 2 |
| 112 | 14 | — | 0.2 | Phytic acid/Molybdic acid | 3.5 | 11 |
| 113 | 15 | Methyl cellulose | 0.2 | Perchloric acid | 3.0 | 6 |
| 114 | 16 | Polyethyleneimine/Polyvinylpyrrolidone | 0.1/0.4 | Phosphomolybdic acid | 4.0 | 0 |
| 115 | 17 | — | — | Phosphoric acid | 4.0 | 9 |
| 116 | 18 | Polyethyleneimine | 0.2 | — | 5.5 | 10 |
| 117 | 19 | Polyvinyl alcohol (s:85%, p:2000)* | 0.3 | Acetic acid | 3.0 | 7 |
| 118 | 20 | Polyvinyl alcohol (s:99%, p:4000)* | 0.3 | Tungstic acid | 3.0 | 2 |
| 119 | 23 | Polyvinyl alcohol (s:90%, p:3000)* | 0.3 | | 2.5 | 26 |
| 120 | 25 | Polyvinyl alcohol (s:80%, p:2200)* | 0.5 | Molybdic acid | 3.0 | 3 |
| 121 | 25 | Polyvinyl alcohol (s:80%, p:2200)*/Polyvinylpyrrolidone | 0.3/0.2 | Phytic acid/Phosphoric acid | 2.5 | 0 |
| 122 | 25 | Polyvinyl alcohol (s:90%, p:2000)* | 0.3/0.2 | Tungstosilicic acid | 2.0 | 1 |
| 123 | 25 | Polyvinyl alcohol (s:90%, p:2000)*/Polyethyleneimine | 0.3/0.3 | p-Toluenesulfonic acid | 2.0 | 3 |
| 124 | 25 | Carboxymethyl cellulose | 0.8 | Perchloric acic | 2.5 | 5 |
| 125 | 10 | Polyethyleneimine | 0.3 | Phosphotungstic acid | 3.0 | 1 |
| 126 | 10 | Polyvinyl alcohol (s:90%, p:2000)*/Polyvinylpyrrolidone | 0.2/0.2 | Phytic acid | 2.5 | 0 |
| 127 | 13 | Polyvinyl alcohol (s:80%, p:2200)* | 0.2/0.2 | Phytic acid | 3.0 | 2 |
| 128 | 13 | Polyvinyl alcohol (s:99%, p:4000)* | 0.2/0.2 | Phosphoric acid/Tungstosilicic acid | 3.0 | 1 |
| 129 | 16 | Polyvinyl alcohol (s:90%, p:2500)* | 0.2/0.2 | Phosphoric acid | 2.0 | 0.5 |
| 130 | 30 | Polyvinyl alcohol (s:90%, p:2500)* | 0.2/0.2 | Phytic acid/Phosphoric acid | 2.0 | |
| 131 | 2 | — | — | — | 6.0 | 250 |
| 132 | 4 | — | — | — | 7.0 | 200 |
| 133 | 11 | Polyvinylpyrrolidone | 0.5 | Acetic acid | 3.0 | 25 |
| 134 | 12 | — | — | Tungstosilicic acid | 3.0 | 30 |
| 135 | 21 | Polyvinyl alcohol (s:85%, p:2000)* | 0.3 | Phosphoric acid | 3.0 | 5 |
| 136 | 22 | Polyvinyl alcohol (s:90%, p:3000)* | 0.3 | Tungstosilicic acid | 3.0 | 7 |
| 137 | 24 | Polyvinyl alcohol (s:80%, p:2200)* | 0.3 | Phytic acid/Phosphoric acid | 2.5 | 3 |
| 138 | 26 | Polyvinyl alcohol (s:80%, p:2200)* | 0.3 | Phosphoric acid | 3.0 | 1 |
| 139 | 27 | Polyvinyl alcohol (s:99%, p:4000)* | 0.3 | Phytic acid | 3.0 | 0 |
| 140 | 28 | Polyvinyl alcohol (s:99%, p:4000)* | 0.3 | Phytic acid/Tungstosilicic acid | 2.5 | 0 |

Remarks
*p stands for degree of polymerization, and s stands for saponification degree.

Remarks:

(1) In U.S. Pat. No. 4,528,336, reactants and reaction conditions are as below.

Examples of the aromatic amino compound include: aniline, 1,2-, 1,3-, and 1,4-phenylenediamines, 2-, 3- and 4-aminophenols, 2-, 3- and 4-chloroanilines, 4-aminoazobenzene, 2,4-diaminoazobenzene, 4-aminoacetanilide, 2-, 3- and 4-methylanilines, 4-aminodiphenylamine, 2-aminodiphenylamine, 4,4'-diaminodiphenylamine, N,N-dimethyl-1,4-phenylenediamine, 4-amino-3'-methoxydiphenylamine, 4-amino-4'-hydroxydiphenylamine, 4-chloro-1,2-phenylenediamine, 4-methoxy-1,2-phenylenediamine, 2-amino-4-chlorophenol, 2,3-diaminotoluene and the like, among which particularly preferred are aniline.

and 4-nitrobenzoic acids and 2-, 3- and 4-nitrobenzenesulfonic acids.

The condensation reaction of the above named aromatic amine and nitro compounds is carried out in the presence of a mineral acid and a condensation catalyst.

Suitable mineral acids are hydrochloric acid, sulfuric acid, nitric acid, phosphoric acid and hydrobromic acid, of which the former two are preferred.

The condensation catalyst is preferably an oxidizing compound selected from the class consisting of permanganic acid, permanganates such as potassium permanganate, chromic acid and related compounds such as chromium trioxide, potassium bichromate and sodium chlorochromate, heavy metal nitrates such as silver nitrate and lead nitrate, halogens such as iodine, bromine and chlorine, inorganic and organic peroxides such as hydrogen peroxide, sodium peroxide, dibenzoyl peroxide, potassium persulfate, ammonium persulfate, peracetic acid, cumene hydroperoxide, perbenzoic acid and p-menthane hydroperoxide, oxyacids and salts thereof such as iodic acid, sodium and potassium iodates and sodium and potassium chlorates, metal salts such as iron(III) chloride, copper sulfate, copper(II) chloride and lead acetate, ozone and metal oxides such as copper oxide, mercury oxide, cerium oxide, manganese dioxide and osmic acid. Iron(II) chloride and copper(I) chloride may be used. It is sometimes advantageous that a small amount of iron(II) chloride is used in combination with hydrogen peroxide.

(2) According to U.S. Pat. No. 4,528,336, Condensation product I and XXI were prepared as described below.

A mixture composed of 1.00 mole of aniline, 0.227 mole of nitrobenzene, 0.310 mole of hydrochloric acid in the form of a 35% aqueous solution and 0.103 mole of iron(III) chloride was heated first at 60° C. for 6 hours followed by temperature elevation up to 180° C. to 185° C. where the mixture was kept with agitation for 15 hours with continuous distilling off of water. The aniline and nitrobenzene distilled out as accompanied by the water were returned to the reaction vessel during the reaction. Thereafter, the temperature of the reaction mixture was further increased to 200° C. and agitation was continued at this temperature for further 5 hours to complete the condensation reaction.

The thus formed reaction product in a molten state was poured into a large volume of a diluted hydrochloric acid and heated at 60° C. for 3 hours. The mixture was then filtered while it was still hot to remove the unreacted aniline in the form of the hydrochloride dissolved in the aqueous phase and the filtered cake was washed 5 to 6 times with water to remove the hydrochloric acid followed by drying to give the condensation product. The yield of this product was 45.2% of the total amount of the aniline and nitrobenzene. This product is called the Condensation product I hereinafter.

Condensation Products II to XX were prepared each in a similar manner to the preparation of the Condensation Product I with the formulation as indicated in Table 3 below for the aromatic amine compound, aromatic nitro compound, mineral acid and condensation catalyst as well as the amounts thereof. Table 3 also gives the yields of the respective condensation products calculated on the total amounts by weight of the aromatic amine and nitro compounds.

Further, Condensation Product XXI was prepared in a following manner. Thus, a mixture composed of 1.00 mole of aniline and 0.310 mole of 35% hydrochloric acid was chilled at 10° C. or below and, after admixing of 0.103 mole of iron(III) chloride, heated to a temperature of 60° C. where it was agitated for 6 hours to effect the condensation reaction of aniline alone. The temperature of this reaction mixture, without removing the unreacted aniline, was increased to 170° C. to distil out water and, while keeping the mixture at this temperature, 0.227 mole of nitrobenzene was added to the reaction mixture over a period of 6 hours followed by rapid temperature increase up to 180° C. to 185° C. where the reaction was continued for 15 hours. During this reaction period, water formed by the condensation reaction was distilled out together with small volumes of aniline and nitrobenzene and the aniline and nitrobenzene were separated from water and returned to the reaction vessel. Thereafter, the temperature of the reaction mixture was further increased to 200° C. and the reaction was completed by agitating the reaction mixture for additional 5 hours at this temperature.

The thus obtained reaction product in a molten state was poured into a large volume of a diluted hydrochloric acid and heated for 3 hours at 60° C. followed by filtration while the mixture was still hot to remove the unreacted aniline dissolved in the aqueous phase. The filtered cake was washed 6 times with water to remove the hydrochloric acid followed by drying to give the condensation product. The yield of this condensation product was 39.2% based on the total amount of the aniline and nitrobenzene initially used.

TABLE 3

| Condensation Product No. | Aromatic amine compound (moles) | Aromatic nitro compound (moles) | Mineral acid (moles) | Condensation catalyst (moles) | Yield % |
|---|---|---|---|---|---|
| I | Aniline (1.00) | Nitrobenzene (0.227) | Hydrochloric (0.310) | Iron (III) chloride (0.103) | 45.2 |
| II | 4-Methylaniline (1.000) | Nitrobenzene (0.262) | Hydrochloric (0.358) | Ammonium persulfate (0.118) | 40.5 |
| III | Aniline (0.349) + 1,4-phenylenediamine (0.370) | Nitrobenzene (0.407) | Hydrochloric (0.334) | Ammonium persulfate (0.088) | 53.1 |
| IV | 4-Methylaniline (0.630) + 4-aminodiphenylamine (0.370) | Nitrobenzene (0.330) | Hydrochloric (0.452) | Ammomiun persulfate (0.089) | 45.0 |
| V | Aniline (0.664) + 4-aminodiphenylamine (0.336) | Nitrobenzene (0.402) | Hydrochloric (0.297) | Ammomiun persulfate (0.098) | 55.3 |
| VI | Aniline (0.605) + 4-chloro-1,2-phenylenediamine (0.395) | 2-Nitrophenol (0.162) | Hydrochloric (0.270) | Ammomiun persulfate (0.074) | 38.7 |
| VII | Aniline (0.540) + 2-aminophenol (0.460) | 4-Nitrophenol (0.217) | Hydrochloric (0.496) | Ammomiun persulfate (0.044) | 60.2 |
| VIII | Aniline (0.500) + 3-aminophenol (0.500) | 4-Nitrophenetole (0.241) | Hydrochloric (0.496) | Hydrogen peroxide (0.296) + iron (II) chloride (0.004) | 57.1 |
| IX | Aniline (0.809) + 4-aminophenol (0.191) | 2-Nitrophenol (0.116) | Sulfuric (0.498) | Hydrogen peroxide (0.443) + iron (II) chloride (0.006) | 48.9 |
| X | Aniline | 2-Amino- | Sulfuric | 4-menthane | 45.0 |

TABLE 3-continued

| Condensation Product No. | Aromatic amine compound (moles) | Aromatic nitro compound (moles) | Mineral acid (moles) | Condensation catalyst (moles) | Yield % |
|---|---|---|---|---|---|
| | (1.000) | nitrobenzene (0.222) | (0.462) | hydroperoxide (0.162) | |
| XI | Aniline (0.682) + 4-amino-4'-hydroxy-diphenlamine (0.318) | 3-Nitroanisole (0.290) | Hydrochloric (0.296) | Sodium iodate (0.118) | 36.7 |
| XII | Aniline (0.607) + 2-amino-4-chlorophenol (0.393) | 2-Chloronitrobenzene (0.215) | Hydrochloric (0.263) | Sodium chlorate (0.239) | 40.5 |
| XIII | Aniline (0.578) + 4-chloroaniline (0.422) | 4-Nitrobenzoic acid (0.148) | Hydrochloric (0.310) | Dibenzoyl peroxide (0.107) | 30.5 |
| XIV | Aniline (0.278) + 4-methylaniline (0.772) | 3-Nitrophenol (0.335) | Hydrochloric (0.298) | Copper (II) chloride (0.126) | 42.0 |
| XV | 4-Aminodiphenylamine (0.370) + 1,3-phenylenediamine (0.630) | 4-Nitrobenzenesulfonic acid (0.243) | Hydrochloric (0.393) | Manganese dioxide (0.330) | 52.1 |
| XVI | 4-Aminodiphenylamine (0.400) + 1,2-phenylenediamine (0.600) | 4-Aminonitrobenzene (0.296) | Hydrochloric (0.393) | Iron (III) chloride (0.096) | 55.3 |
| XVII | Aniline (0.538) + 1,2-phenylenediamine (0.462) | 4-Chloronitrobenzene (0.203) | Hydrochloric (0.286) | Ammonium persulfate (0.132) | 47.1 |
| XVIII | Aniline (1.000) | Nitrobenzene (0.227) | Hydrochloric (0.310) | Iron (II) chloride | 40.1 |
| XIX | Aniline (1.000) | Nitrobenzene (0.060) | Hydrochloric (0.310) | Iron (III) chloride (0.103) | 20.1 |
| XX | Aniline (1.000) | Nitrobenzene (0.755) | Hydrochloric (0.310) | Iron (III) chloride (0.103) | 40.1 |
| XXI | Aniline (1.000) | Nitrobenzene (0.227) | Hydrochloric (0.310) | Iron (IV) chloride (0.103) | 39.2 |

We claim:

1. In a process for preparing a polymer wherein a monomer having an ethylenic double bond comprising a haloethylene, as an essential component, represented by the general formula (I):

$$(X)(R)C=CH_2 \tag{I},$$

wherein X is a halogen atom and R is a hydrogen atom or halogen atom, is subjected to polymerization conditions in a polymerization vessel having a coating on its inner surfaces, the improvement wherein said coating comprises:
   (A) an aromatic compound or a dye, both having at least one group selected from the class consisting of primary, secondary and tertiary amino groups, a quaternary ammonium group and the azo group or a dye having at least one group selected from said class;
   (B) an alkali metal salt of a polyvinylsulfonic acid;
   (C) a naphthoquinone natural dye comprising at least one compound selected from the group consisting of lawsone, naphthopurpurin, alkannan, alkannin, shikonins and the derivatives of shikonins;
   (D) a water-soluble polymeric compounds; and
   (E) a pH adjuster in an amount such that the pH of said coating is 6 or lower;
whereby polymer scale is prevented from depositing in the polymerization vessel.

2. The process according to claim 1, wherein said polymerization is a suspension polymerization, emulsion polymerization, solution polymerization, bulk polymerization or gas phase polymerization.

3. The process according to claim 1, wherein said monomer is a mixture of a haloethylene and a monomer copolymerizable with the haloethylene, the haloethylene being present in an amount of 50% by weight or more in the whole monomers.

* * * * *